(12) United States Patent
Mohammed et al.

(10) Patent No.: US 11,702,185 B2
(45) Date of Patent: Jul. 18, 2023

(54) FREIGHTER CONFIGURATION FOR AIRCRAFT WITH COMPOSITE WINGS

(71) Applicant: The Boeing Company, Chicago, IL (US)

(72) Inventors: Anil A. Mohammed, Mill Creek, WA (US); Colin L. Farr, Lynnwood, WA (US); Kin Yee Cindy Leung-Yuen, Shoreline, WA (US); Erik A. Phillips, Kirkland, WA (US); Timothy B. Adams, Seattle, WA (US); Jens K. Biemann, Woodinville, WA (US); Jose Luis Martinez, Kirkland, WA (US); Michael R. Rush, Mukilteo, WA (US); Daniel H. Fletcher, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 88 days.

(21) Appl. No.: 17/378,538

(22) Filed: Jul. 16, 2021

(65) Prior Publication Data

US 2022/0161918 A1 May 26, 2022

Related U.S. Application Data

(60) Provisional application No. 63/117,858, filed on Nov. 24, 2020.

(51) Int. Cl.
*B64C 1/20* (2006.01)

(52) U.S. Cl.
CPC ..................... *B64C 1/20* (2013.01)

(58) Field of Classification Search
CPC .............. B64C 1/20; B64C 1/065; B64C 1/26
See application file for complete search history.

(56) References Cited

U.S. PATENT DOCUMENTS

| 4,824,050 A * | 4/1989 | Courter ..................... B64D 9/00 206/386 |
| 2010/0213315 A1* | 8/2010 | Marpinard ................ B64C 1/18 244/119 |

* cited by examiner

*Primary Examiner* — Timothy D Collins
*Assistant Examiner* — Eric Acosta
(74) *Attorney, Agent, or Firm* — Duft & Bornsen, PC (57) ABSTRACT

Embodiments for commercial freighter configuration for aircraft with composite wings. One embodiment is cargo floor structure for a wing center section of an aircraft. The cargo floor structure includes over wing floor beams extending longitudinally between a rear spar and a front spar of the aircraft. The over wing floor beams are coupled with an upper skin panel of a composite wing. The cargo floor structure also includes intercostals extending spanwise across the over wing floor beams. The intercostals suspended over the upper skin panel of the composite wing. The cargo floor structure also includes a truss box structure disposed between a middle pair of the over wing floor beams and configured to shear a spanwise load from the intercostals into the upper skin panel of the composite wing.

20 Claims, 6 Drawing Sheets

FREIGHTER CONFIGURATION FOR AIRCRAFT WITH COMPOSITE WINGS

RELATED APPLICATIONS

This non-provisional patent application claims priority to U.S. Provisional Patent Application No. 63/117,858 filed on Nov. 24, 2020, which is incorporated by reference as if fully provided herein.

FIELD

This disclosure relates to the field of aircraft and, in particular, to a cargo floor structure of an aircraft.

BACKGROUND

A freighter variant of an aircraft is typically different than that of a passenger aircraft due to the additional support and load paths required for the cargo floor. A typical freighter aircraft has an aluminum fuselage and wings. However, aircraft are increasingly made with composite materials that provide numerous flight performance and durability benefits as compared to metal. Existing metal freighter architectures are not compatible with composite wing structure because composite material has increased sensitivity to out of plane loads and highly concentrated loads. Therefore, aircraft manufacturers seek approaches that allow for compatibility between an aircraft cargo architecture and composite materials.

SUMMARY

Embodiments described herein provide a freighter configuration for aircraft with composite wings. A cargo floor structure is provided which decreases out of plane loads and highly concentrated loads acting upon the composite wing. This advantageously enables cargo support structure to be compatible with composite wings, thus providing numerous flight performance benefits to the freighter variant of an aircraft.

One embodiment is cargo floor structure for a wing center section of an aircraft. The cargo floor structure includes over wing floor beams extending longitudinally between a rear spar and a front spar of the aircraft. The over wing floor beams are coupled with an upper skin panel of a composite wing. The cargo floor structure also includes intercostals extending spanwise across the over wing floor beams. The intercostals suspended over the upper skin panel of the composite wing. The cargo floor structure also includes a truss box structure disposed between a middle pair of the over wing floor beams and configured to shear a spanwise load from the intercostals into the upper skin panel of the composite wing.

Another embodiment is an aircraft that includes a fuselage, composite wings, a wing center section coupling the composite wings and the fuselage, and a cargo floor structure disposed on top of the wing center section. The cargo floor structure includes over wing floor beams extending longitudinally between a rear spar and a front spar of the aircraft. The over wing floor beams are coupled with an upper skin panel of a composite wing. The cargo floor structure also includes intercostals extending spanwise across the over wing floor beams. The intercostals suspended over the upper skin panel of the composite wing. The cargo floor structure also includes a truss box structure disposed between a middle pair of the over wing floor beams and configured to shear a spanwise load from the intercostals into the upper skin panel of the composite wing.

Yet another embodiment is a method of supporting cargo over a wing center section of an aircraft. The method includes supporting a vertical force from the cargo with over wing floor beams which extend longitudinally between a rear spar and a front spar of the aircraft, the over wing floor beams coupled with an upper skin panel of a composite wing. The method also includes supporting a horizontal force from the cargo with intercostals which extend spanwise across the over wing floor beams, the intercostals suspended over the upper skin panel of the composite wing. The method further includes transmitting, with a truss box structure, the horizontal force from the intercostals into the upper skin panel of the composite wing.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific example embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
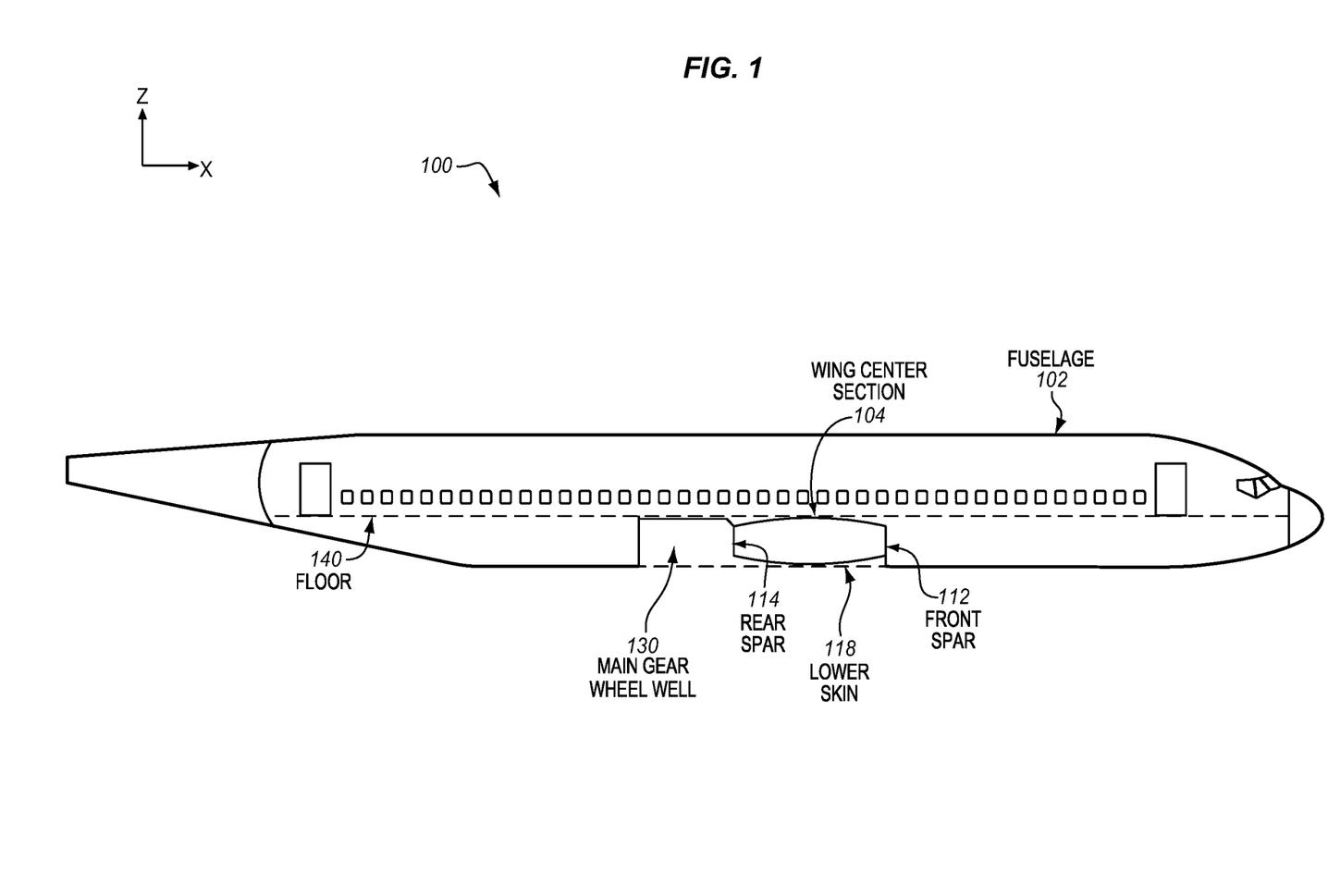
FIG. 1 is a side cross-sectional view of an aircraft.

FIG. 1 is a side cross-sectional view of an aircraft 100. The aircraft 100 includes a fuselage 102 and wings coupled thereto at a wing center section 104. The wing center section 104, sometimes referred to as wing carry-through, provides structure for supporting the wings and carrying flight loads. In particular, the wing center section 104 includes a front spar 112 and rear spar 114 which provide the main structural elements of the wings and which extend spanwise through the fuselage 102 (e.g., approximately perpendicular to the fuselage 102 depending on wing sweep). The wing center section 104 also includes an upper skin panel 116 and lower skin panel 118 which complete a torque box connecting the front spar 112 and rear spar 114. The skin panels 116-118 typically include stiffening elements on the inside of the torque box, which for composite construction are typically adhesively bonded or co-cured. Typically, the wing center section 104 is situated forward from a main gear wheel well 130.

The wing center section 104 may integrate with a portion of a floor 140 in the fuselage 102 which supports aircraft loads including passengers and/or cargo. In a freighter variant of the aircraft 100 there is increased load transferred from cargo on the floor 140 to the wing center section 104. Existing structural configurations between the floor 140 and wing center section 104 assume the use of metal materials and are not compatible with composite material in the wing center section 104.

Figure 2:
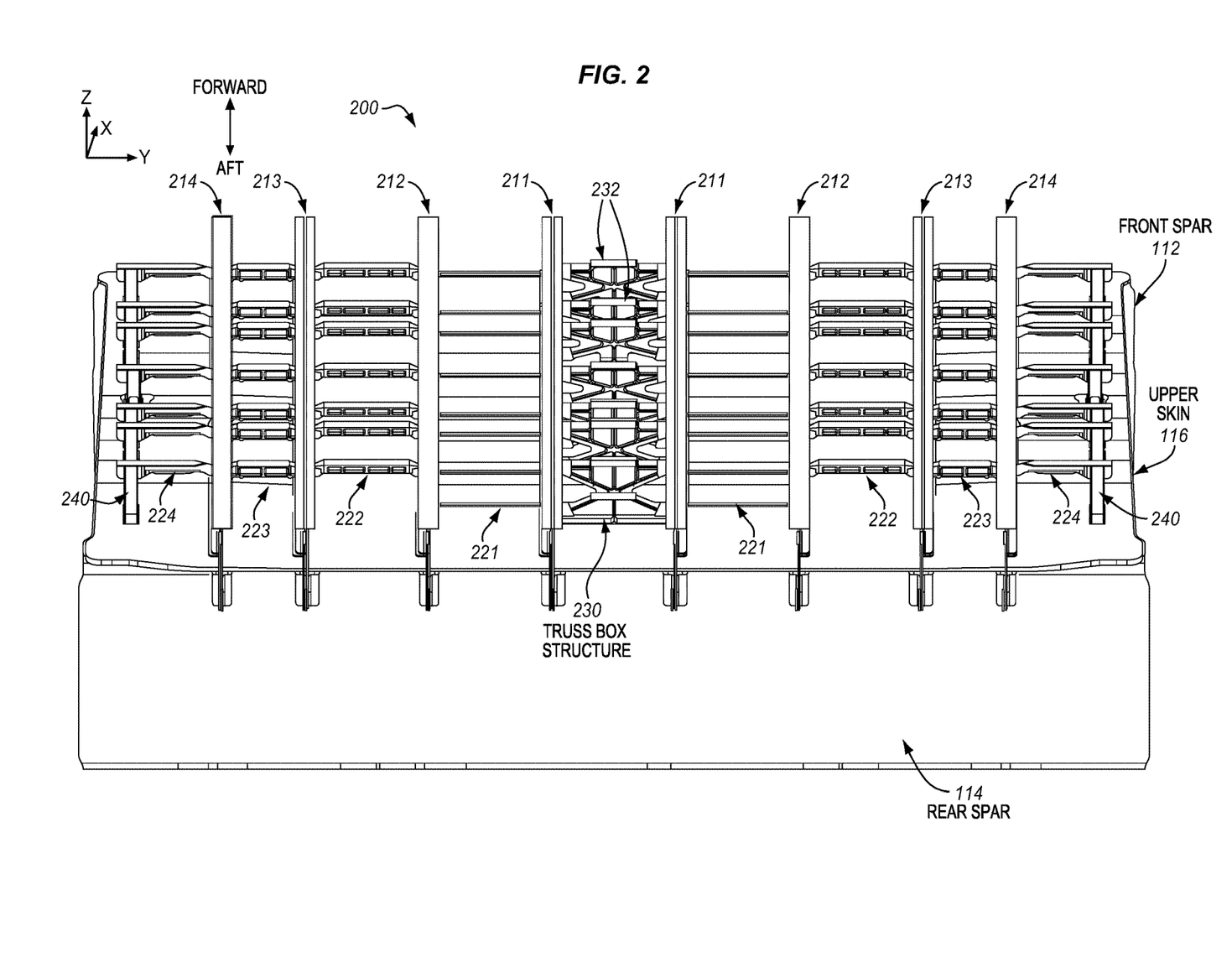
FIG. 2 is a perspective view of a cargo floor structure in an illustrative embodiment.

FIG. 2 is a perspective view of a cargo floor structure 200 in an illustrative embodiment. The cargo floor structure 200 is generally disposed on top of the upper skin panel 116 of the wing center section 104 and forms support for a cargo floor. Advantageously, the cargo floor structure 200 provides a configuration in which increased loads of a cargo floor are compatible with composite materials of an aircraft. For example, structure of the wings such as the upper skin panel 116 of the wing center section 104 may comprise composite material structure as opposed to a metal structure. As further described below, the cargo floor structure 200 provides a technical benefit in distributing loads from the cargo into the upper skin panel 116 without introducing detrimental load into the composite material of the upper skin panel 116. Though sometimes described with respect to the aircraft 100 of FIG. 1, the cargo floor structure 200 may be implemented in alternative aircraft.

The cargo floor structure 200 generally includes over wing floor beams 211-214, intercostals 221-224, vertical post supports 240, and a truss box structure 230. The over wing floor beams 211-214 extend longitudinally (e.g., forward/aft or in the x-direction) between the rear spar 114 and the front spar 112 of the aircraft. The over wing floor beams 211-214 and vertical post supports 240 are coupled with the upper skin panel 116 which, as described earlier, may be part of a composite wing. The intercostals 221-224 extend spanwise (e.g., inboard/outboard, transversely, or in the y-direction) between a left side and a right side of the aircraft. The intercostals 221-224 are suspended over the upper skin panel 116. The truss box structure 230 is disposed between a middle pair of over wing floor beams (e.g., over wing floor beams 211) and configured to shear a spanwise load from the intercostals 221-224 into the upper skin panel 116.

The truss box structure 230 is configured to receive a spanwise load (e.g., acting in the inboard/outboard direction along intercostals 221-224, sometimes referred to as side load, horizontal load, or transverse load) of supported cargo and transmit the load downward into the upper skin panel 116 by shearing. A shear force is a force applied perpendicular to a surface, in opposition to an offset force acting in the opposite direction. In this case, a top side of the truss box structure 230 couples, either directly or indirectly, with one or more intercostals 221-224 and a bottom side of the truss box structure 230 couples with the upper skin panel 116. The truss box structure 230 shears spanwise forces of the intercostals 221-224 acting at its top side with the opposing, offset force at its bottom side where the truss box structure 230 attaches with the upper skin panel 116. Accordingly, the truss box structure 230 directs spanwise loads in the upper skin panel 116 in a manner that decreases out of plane loads and highly concentrated loads acting upon the upper skin panel 116 of the composite wing.

Connection of the truss box structure 230 to the upper skin panel 116 may be segmented into shorter elements or include local discontinuities to minimize detrimental mechanical or thermal induced loads at the wing skin panel attachment. Avoiding out of plane loads on a composite skin panel helps to avoid damaging or delaminating the bonded stiffening elements. Metallic skin panels typically have mechanically fastened stiffening elements that are much less sensitive to these out of plane loads. In one embodiment, the truss box structure 230 is located in one single bay at the aircraft line of symmetry to minimize induced loading from wing deflections and from mismatch in thermal expansion properties between the composite skin and truss box structure 230 (which is typically metal), while at the same time providing enough width to adequately distribute the out of plane loads into the composite structure.

The truss box structure 230 may comprise a series of truss members 232 spaced longitudinally from one another in a direction between the rear spar 114 and the front spar 112 of the aircraft, as shown in FIG. 2. That is, the truss box structure 230 may be disposed along a longitudinal center of the fuselage 102 or wing center section 104 (e.g., aligned in the X-direction) and support a middle longitudinal section of the cargo floor structure 200. And, the truss box structure 230 transfers vertical and lateral load of cargo resting on the cargo floor structure 200 forward to the front spar 112 and aft to the rear spar 114. This intercostal system running spanwise across the width of the aircraft fuselage may be repeated along the length of the wing.

By receiving spanwise load from the intercostals 221-224 that would otherwise transfer into the over wing floor beams 111-114 or the vertical post supports 240, the truss box structure 230 is configured to reduce transmission of the spanwise load into the over wing floor beams 111-114 and vertical post supports 240. The configuration of the over wing floor beams 211-214, vertical post supports 240, intercostals 221-224, and truss box structure 230 thus advantageously prevents spanwise loads from bending the over wing floor beams 221-214, from bending the vertical post supports 240, and introducing pull-off force to the upper skin panel 116. Furthermore, the truss box structure 230 advantageously distributes spanwise loads from the cargo over a relatively larger, stronger surface area of the upper skin panel 116 as opposed to previous approaches that have increased reliance on transmitting side load into the over wing floor beams 211-214, or by use of single force members (e.g., tie rods) that apply concentrated loads to the upper skin panel 116. Earlier mentioned prior approaches apply loads that are inefficient for parts built with composite materials. Thus, by reducing out of plane and concentrated loads transmitted into the upper skin panel 116, the truss box structure 230 enables the cargo floor structure 200 to be compatible with a composite wing.

Figure 3:
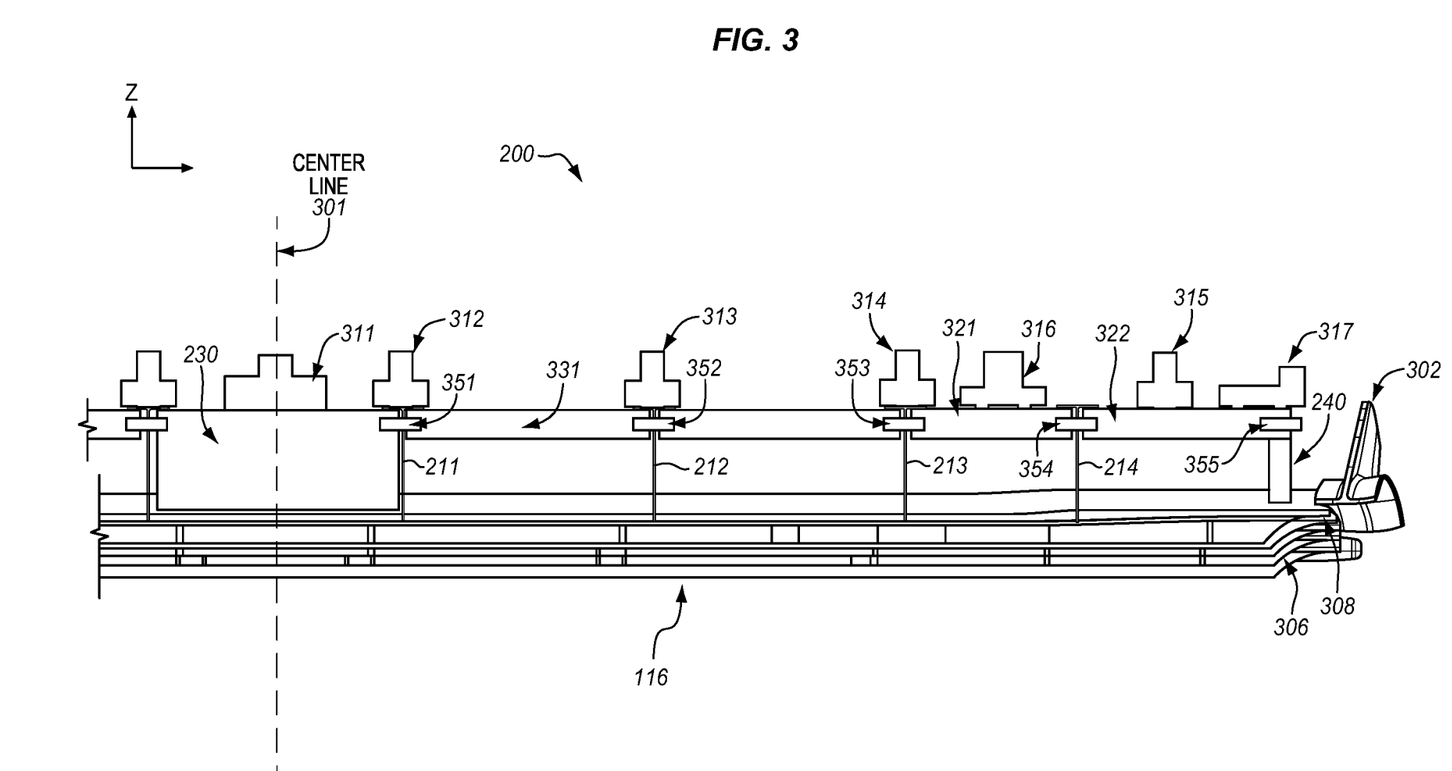
FIG. 3 is a front view of the cargo floor structure in an illustrative embodiment.

FIG. 3 is a front view of the cargo floor structure 200 in an illustrative embodiment. FIG. 3 shows one half of the cargo floor structure 200 from a center line 301 to a side of body 302 where the wing and fuselage intersect. Structural components of the cargo floor structure 200 may be mirrored at left/right sides and thus may be shown/described herein with respect to a single location to represent one of the two sides.

As shown in FIG. 3, the cargo floor structure 200 may include or support cargo elements 311-317 configured to support cargo load. Examples include a center guide 311, roller trays 312-313, side locks 316, and end restraints 317, though it will be appreciated that other cargo elements configured to transport and restrain cargo in the aircraft and numerous arrangements are possible. The cargo elements 311-317 are supported by the over wing floor beams 211 and/or some combination of spanwise elements including one or more intercostals 321-322. In areas where spanwise support of a cargo element 311-317 is not necessary, a tie rod 331 may provide spanwise structure instead of an intercostal to save on cost and weight. Generally speaking, an intercostal is a structural member extending across adjacent over wing floor beams 211-214 and providing sufficient structure for supporting vertical load of one or more cargo elements 311-317.

In this example, a tie rod 331 extends spanwise between over wing floor beams 211-212, a first intercostal 321 is outboard from the tie rod 331 and extends spanwise between over wing floor beams 213-214, and a second intercostal 322 is outboard from the first intercostal 321 and extends between over wing floor beam 214 and a vertical post support 240. Additionally, spanwise supports including one or more tie rods 331 and one or more intercostals 321-322 are joined with each other via sliding pins 351-355 to form a connected spanwise structure extending between the vertical post support 240 and the truss box structure 230. The spanwise structure is configured to slide laterally across the over wing floor beams 211-214 to avoid transmission of the spanwise load into the over wing floor beams 211-214 and prevent potential detrimental load to the over wing floor beams 211-214 and the upper skin panel 116. Since the wing and wing center section 104 may comprise composite material, the upper skin panel 116 may include stringers 306 and shell structure 308. Accordingly, the sliding movement of the intercostals 321-232 through the over wing floor beams 211-214 prevents bending the over wing floor beams 211-214 and avoids a pull-off force on the stringers 306.

Figure 4:
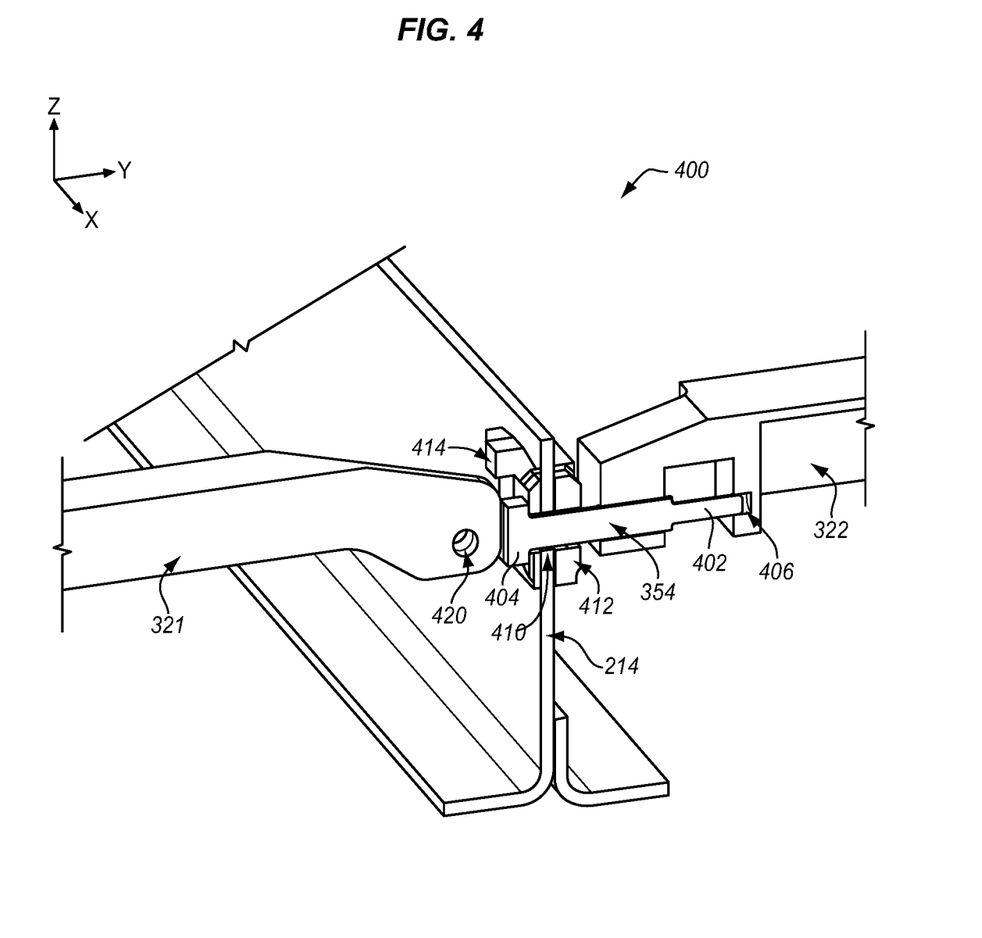
FIG. 4 is a perspective view of a sliding pin connection in an illustrative embodiment.

FIG. 4 is a perspective view of a sliding pin connection 400 in an illustrative embodiment. In this example, the first intercostal 321 and second intercostal 322 are coupled with each other via sliding pin 354 configured to slide through over wing floor beam 214 to prevent transmission of spanwise load into the over wing floor beam 214. The sliding pin 354 includes a rod 402 extending through a passageway 410 and bushing 412 of the over wing floor beam 214. A head 404 at one end of the sliding pin 354 couples with the first intercostal 321 via pin joint 420, and a tail end at the other end of the rod 402 slides within a spaced groove 406 of the second intercostal 322. The sliding pin 354 may therefore translate in the inboard/outboard direction for a distance until restricted by the head 404.

In one embodiment, over wing floor beam 214 comprises a composite material and includes a metal reinforcement 414 to strengthen its side walls. In another embodiment, the sliding pin connection 400 includes a pin joint 420 coupling the intercostals 321-322 to enable a degree of rotation between the intercostals 321-322 for managing wing deflections and preventing bending motion from translating along the cargo floor structure 200. The sliding pin connection 400 may be similarly implemented at over wing floor beams 211-213 and/or vertical post support 240. It will be appreciated that various other sliding pin arrangements may also be possible.

Figure 5:
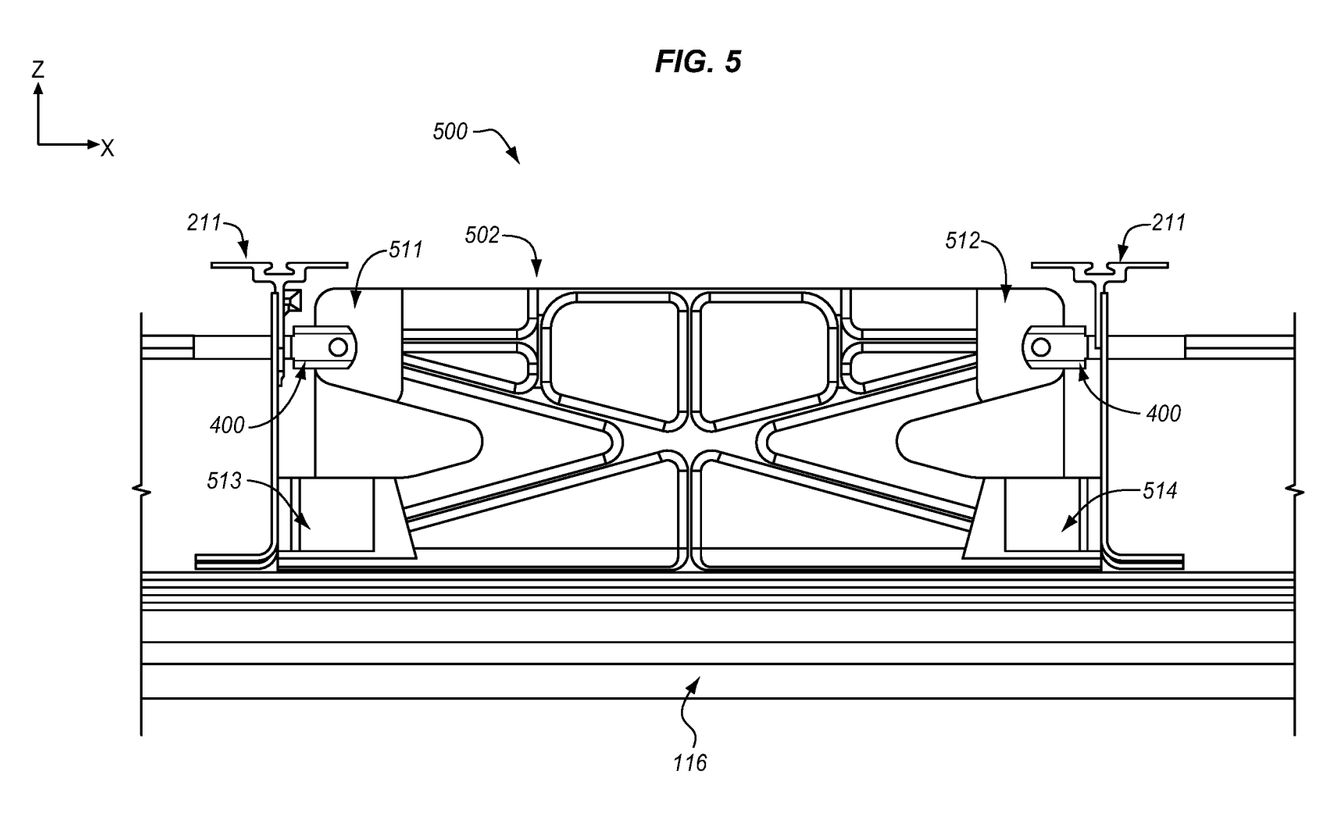
FIG. 5 is a front view of a truss member in an illustrative embodiment.

FIG. 5 is a front view of a truss member 500 in an illustrative embodiment. As earlier described earlier, the truss box structure 230 may include a series of truss members (e.g., truss members 232 or truss members 500) to shear side loads into the upper skin panel 116. As shown in this example, each truss member 500 may comprise a box plate body 502 aligned in a vertical plane (e.g., z-y plane) and including corners 511-514 coupled or situated proximate with the over wing floor beams 211. In particular, one upper corner 511 receives side load through a sliding pin connection 400 through one over wing floor beam 211, and the other upper corner 512 is similarly configured for side load and over wing floor beam 211 on the other side. And, one bottom corner 513 is disposed on top of the upper skin panel 116 proximate to one over wing floor beam 211, and other bottom corner 514 is similarly disposed at the over wing floor beam 211 on the other side. This structure enables transmission of side loads into the upper skin panel 116 as previously described.

Figure 6:
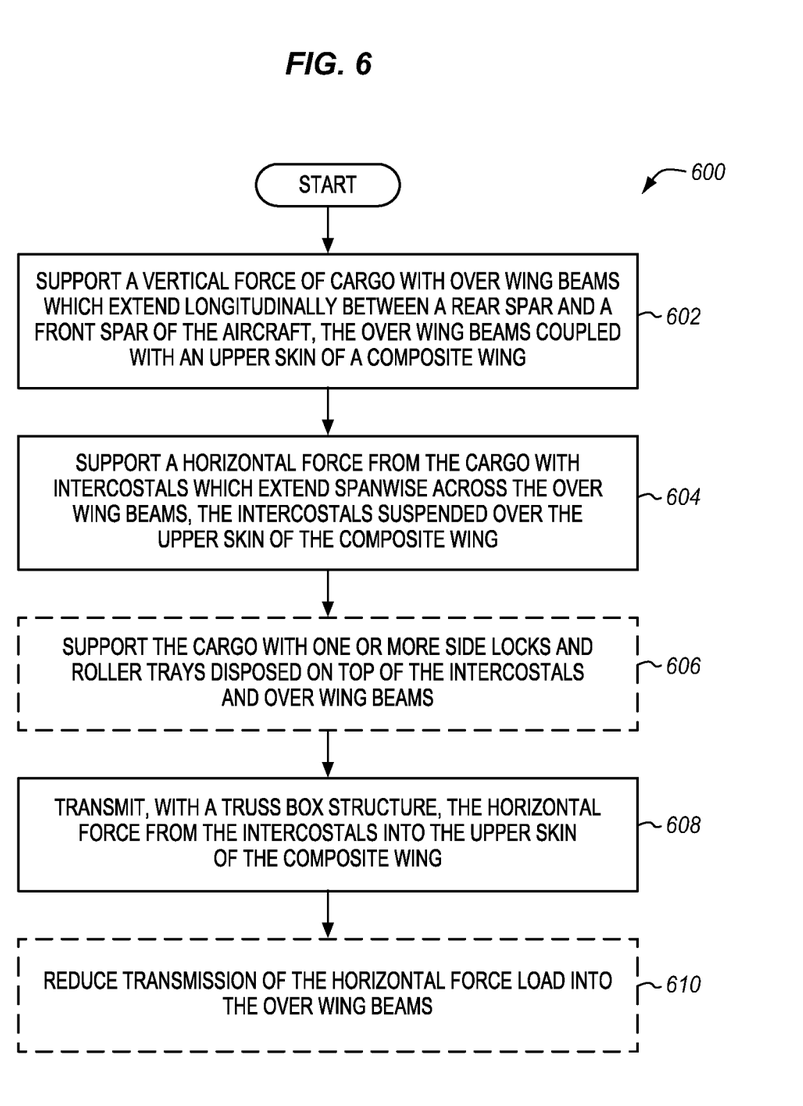
FIG. 6 is a flowchart illustrating a method of supporting cargo over a wing center section of an aircraft in an illustrative embodiment.

FIG. 6 is a flowchart illustrating a method 600 of supporting cargo over a wing center section of an aircraft in an illustrative embodiment. The method 600 is described with respect to the cargo floor structure 200 and related components described with respect to FIGS. 2-5, however, it will be appreciated that the method 600 may apply to alternative configurations and structures. The steps of the flowcharts described herein are not all inclusive, may include other steps not shown, and may be performed in an alternative order. Additionally, it will be appreciated that the embodiments of the disclosure may apply to aircraft 100 or to alternative aircraft.

In step 602, a vertical force from cargo is supported with over wing floor beams 211-214 which extend longitudinally between a rear spar 114 and a front spar 112 of the aircraft. As earlier described, the over wing floor beams 211-214 may be coupled with upper skin panel 116 of a composite wing. In step 604, a horizontal force from the cargo is supported with intercostals 221-224 which extend spanwise across the over wing floor beams 211-214. The intercostals 221-224 are suspended over the upper skin panel 116 of the composite wing. In optional step 606, the cargo is supported by one or more side locks 316 and one or more roller trays 312-313 disposed on top of the intercostals 221-224 and over wing floor beams 211-214.

In step 608, the truss box structure 230 transmits the horizontal force from the intercostals 221-224 into the upper skin panel 116 of the composite wing. In some embodiments, a sliding pin 354 transmits the horizontal force toward the truss box structure 230 to avoid transmission of the horizontal force into the over wing beam(s) 211-214. A sliding pin 354 extending through over wing beam(s) 211-214 may couple at least one pair of intercostals 221-224. In another embodiment, at least one pair of intercostals 221-224 are coupled via a pin joint 420 to enable a degree of rotation between the at least one pair of intercostals 221-224 to manage wing deflections. In optional step 610, the configuration of the truss box structure 230 and/or intercostals 221-224 reduces transmission of the horizontal force load into the over wing floor beams 211-214. Advantageously, the cargo floor structure 200 is compatible with composite material used in the aircraft such as the wings, wing center section 104, and upper skin panel 116.

Although specific embodiments were described herein, the scope is not limited to those specific embodiments. Rather, the scope is defined by the following claims and any equivalents thereof.

What is claimed is:
1. A cargo floor structure for a wing center section of an aircraft, the cargo floor structure comprising:
over wing floor beams extending longitudinally between a rear spar and a front spar of the aircraft, the over wing floor beams coupled with an upper skin panel of the wing center section;

intercostals extending spanwise across the over wing floor beams, the intercostals suspended over the upper skin panel; and a truss box structure disposed between a middle pair of the over wing floor beams and configured to shear a spanwise load from the intercostals into the upper skin panel;

wherein a first intercostal and a second intercostal of the intercostals are coupled via a sliding pin configured to slide through a passageway of one of the over wing floor beams to prevent transmission of the spanwise load into the one of the over wing floor beams.

2. The cargo floor structure of claim 1 wherein:
the truss box structure is configured to reduce transmission of the spanwise load into the over wing floor beams.

3. The cargo floor structure of claim 1 wherein:
the truss box structure includes a series of truss members spaced longitudinally from one another between the rear spar and the front spar of the aircraft.

4. The cargo floor structure of claim 1 wherein:
the truss box structure is configured to support a middle longitudinal section of the cargo floor structure.

5. The cargo floor structure of claim 1 further comprising:
cargo elements configured to support cargo load.

6. The cargo floor structure of claim 5 wherein:
the cargo elements are supported by the over wing floor beams and the intercostals.

7. The cargo floor structure of claim 5 wherein:
the cargo elements include one or more side locks and one or more roller trays.

8. The cargo floor structure of claim 1 wherein:
the sliding pin comprises:
　a rod extending through the passageway of the one of the over wing floor beams;
　a head at one end of the rod that couples with the first intercostal; and
　a tail end at an opposing end of the rod that slides within a spaced groove of the second intercostal.

9. The cargo floor structure of claim 1 wherein:
the first intercostal and the second intercostal form a connected spanwise structure extending between a vertical post support and the truss box structure configured to slide laterally across the over wing floor beams to prevent transmission of the spanwise load into the over wing floor beams.

10. An aircraft comprising:
a fuselage;
composite wings;
a wing center section coupling the composite wings and the fuselage, the wing center section comprising an upper skin panel and a lower skin panel; and
a cargo floor structure disposed on top of the wing center section, the cargo floor structure comprising:
　over wing floor beams extending longitudinally between a rear spar and a front spar of the aircraft, the over wing floor beams coupled with the upper skin panel;
　intercostals extending spanwise across the over wing floor beams, the intercostals suspended over the upper skin panel; and
　a truss box structure disposed between a middle pair of the over wing floor beams and configured to shear a spanwise load from the intercostals into the upper skin panel;
　wherein a first intercostal and a second intercostal of the intercostals are coupled via a sliding pin configured to slide through a passageway of one of the over wing floor beams to prevent transmission of the spanwise load into the one of the over wing floor beams.

11. The aircraft of claim 10 wherein:
the truss box structure is configured to reduce transmission of the spanwise load into the over wing floor beams.

12. The aircraft of claim 10 wherein:
the truss box structure includes a series of truss members spaced longitudinally from one another between the rear spar and the front spar of the aircraft.

13. The aircraft of claim 10 wherein:
the cargo floor structure includes cargo elements configured to support cargo load, the cargo elements supported by the over wing floor beams and the intercostals.

14. The aircraft of claim 10 wherein:
the sliding pin comprises:
　a rod extending through the passageway of the one of the over wing floor beams;
　a head at one end of the rod that couples with the first intercostal; and
　a tail end at an opposing end of the rod that slides within a spaced groove of the second intercostal.

15. A method of supporting cargo over a wing center section of an aircraft, the method comprising:
supporting a vertical force from the cargo with over wing floor beams which extend longitudinally between a rear spar and a front spar of the aircraft, the over wing floor beams coupled with an upper skin panel of the wing center section;
supporting a horizontal force from the cargo with intercostals which extend spanwise across the over wing floor beams and transmit the horizontal force to a truss box structure while preventing transmission of the horizontal force to the over wing floor beams, the intercostals suspended over the upper skin panel; and
transmitting, with the truss box structure, the horizontal force from the intercostals into the upper skin panel;
wherein a sliding pin transmits the horizontal force between a first intercostal and a second intercostal of the intercostals, and wherein the sliding pin is configured to slide through a passageway of one of the over wing floor beams to prevent the transmission of the horizontal force into the one of the over wing floor beams.

16. The method of claim 15 further comprising:
supporting the cargo with one or more side locks and roller trays disposed on top of the intercostals and the over wing floor beams.

17. The cargo floor structure of claim 8 wherein:
the head of the sliding pin couples with the first intercostal via a pin joint.

18. The cargo floor structure of claim 8 wherein:
the rod extends through the passageway and a bushing of the one of the over wing floor beams.

19. The aircraft of claim 14 wherein:
the head of the sliding pin couples with the first intercostal via a pin joint.

20. The aircraft of claim 10 wherein:
the first intercostal and the second intercostal form a connected spanwise structure extending between a vertical post support and the truss box structure configured to slide laterally across the over wing floor beams to prevent transmission of the spanwise load into the over wing floor beams.

\* \* \* \* \*